UNITED STATES PATENT OFFICE.

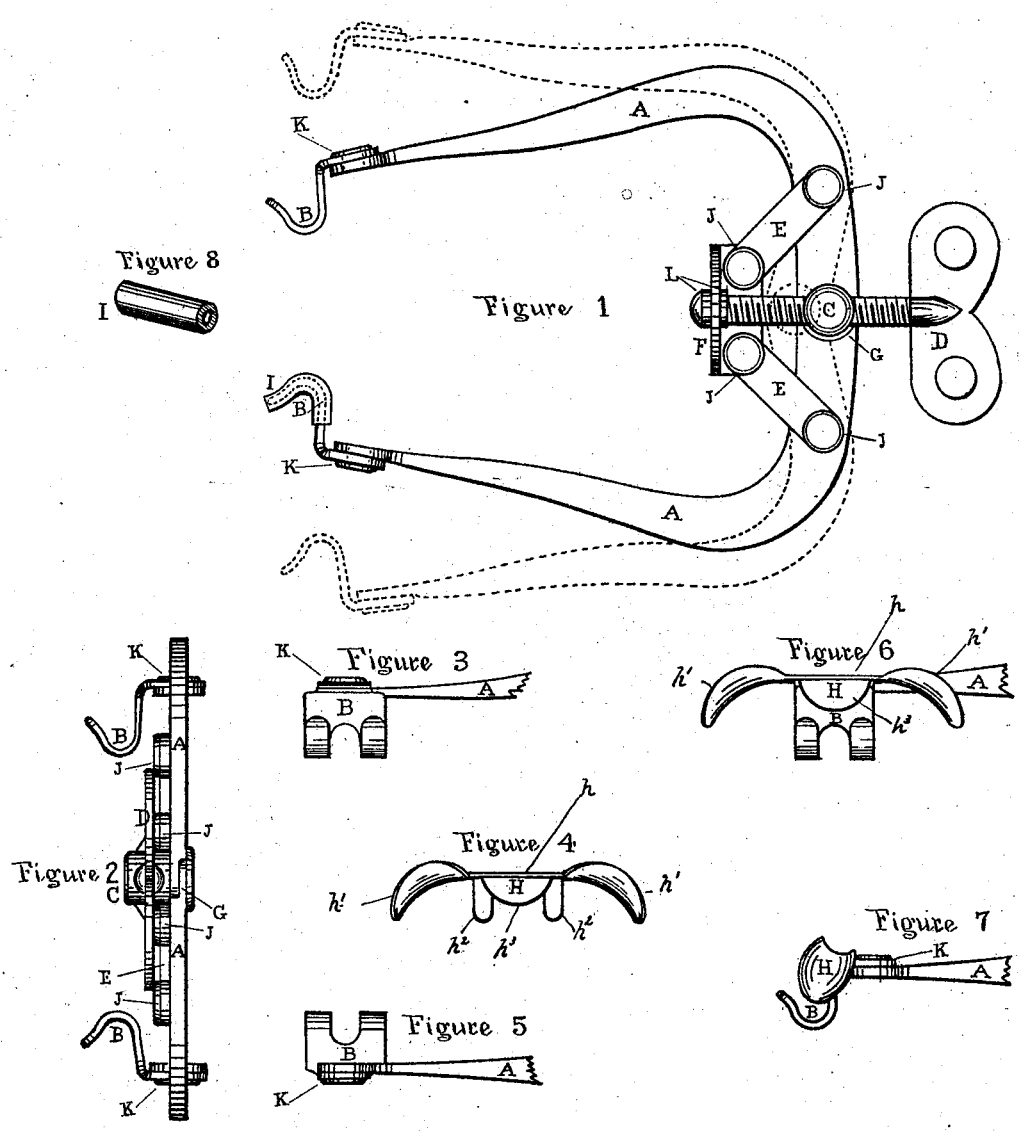

CLEVELAND G. DAVIS, OF MANISTEE, MICHIGAN.

DENTAL EXPANDER OR DILATOR.

No. 815,907. Specification of Letters Patent. Patented March 20, 1906.

Application filed March 27, 1905. Serial No. 252,349.

*To all whom it may concern:*

Be it known that I, CLEVELAND G. DAVIS, a citizen of the United States, residing at Manistee, in the county of Manistee and State of Michigan, have invented new and useful Improvements in Dental Expanders or Dilators, of which the following is a specification.

The objects of my invention are, first, to provide an instrument of the character mentioned for engaging the teeth and opening the jaws of the patient by an expansion-screw, for any operation or need whatsoever, and holding the jaws apart and the mouth open, which said instrument may be turned entirely out of the way during the operation; second, to provide a lip-dilator for use in connection with the jaw-expander, which lip-dilator is made attachable to the hook and is held in place by friction alone, so that there is nothing in the way of attaching devices to harm the gums or lips or other part of the mouth, the said attachable device operating to dilate the lips and push the same away or aside from the teeth, thus permitting light to enter the mouth and throat, and especially preventing injury to the lips, because of possible contact with any instrument used in performing said operation; third, to provide hook lift attachments, upon which may be placed removable sections of rubber tubing or other cognate means to cover the hooks, which may be perfectly fitted to the teeth or gums to prevent injury to them during the operation, which tubes are to be removed after each operation and effectually cleansed, thus providing for complete sterilization and cleaning by anesthetics of all parts of the instrument. I attain these and other desirable objects by an instrument constructed of nickel, steel, or other desirable metal, as is represented in the accompanying drawings, forming a part of this specification, in which—

Figure 1 shows the dilator in plan. Fig. 2 is an end view looking from the hooks toward the screw end. Fig. 3 is a front view of one of the hooks, showing them as pivoted to the bow and turned at a right angle thereto. Fig. 4 is a front view of the lip-dilator. Fig. 5 is a rear view of the hooks turned at a right angle to the bow-arms to which they are pivoted. Fig. 6 is a front view of the hooks as shown in Fig. 3 and showing also the lip-dilator connected therewith, which is held frictionally. Fig. 7 is a side view of the parts as shown in Fig. 6. Fig. 8 shows a section of rubber tubing to be used in covering the hooks as shown in Fig. 1.

In the drawings, A designates the frame or bows, constructed with a hinge G, so as to allow it to be expanded and closed, as indicated by the dotted and full lines in Fig. 1.

B B are hooks formed on the end of an angular plate attached to the ends of the bow-arms or frame A A by means of a pivot K to keep the instrument in the mouth and engaged with the teeth or gums, so that the arms and bow portion of the frame can be moved to one side or the other, leaving the open mouth free and unobstructed—that is, out of the way of the operator when at work in the mouth. The said hooks are covered with short pieces of rubber tubing I, as shown at one side in Fig. 1, or pads of rubber or the like, which may be removed from the hooks and cleansed, will answer as well.

C is the hub constructed and working within and coöperating with the hinge G upon the frame or bows A A, as shown in Figs. 1 and 2.

D designates an expansion thumb-screw working through the hub C by means of a thread cut thereon and inturned by means of the key-shaped head shown, the said expansion thumb-screw passing through the bracket F and attached thereto by the collars L.

E E are braces connecting the bracket F with the bows A A by means of the pivots J J J J at each of their ends. The bracket F has the inner end of the expansion-screw D attached to it by means of the collar L, which is connected to the bows A A and braces E E, as is clearly shown.

G designates the hinge connecting the two sections of the bows A A of the frame with each other, allowing them to open and shut or be expanded and closed, as already indicated with reference to Fig. 1 and the full and dotted lines thereof.

H is an attachment to support and expand or dilate the lips of the patient and is shown in Figs. 4, 6, and 7. It is constructed with a cross-piece $h$, provided with a spoon-shaped tip $h'$ on each end thereof to receive the lips, and from the said cross-piece there depends two legs or prongs $h^2 h^2$, and in front of and between the legs $h^2$ there depends a half-round plate $h^3$ in such a way as to leave a slight space between the said legs and plate.

With this construction the cross-piece $h$ is placed upon the part of the plate extending horizontally from the pivot upon which the the hooks B are formed (see Fig. 6) with the legs $h^2$ astride of the plate and behind it, (see dotted lines in Fig. 6,) and the plate $h^3$ in front of the base of the hook-plate B. In this way the lip-dilators or spoon-like supports $h'$ will extend out on each side and curve gracefully downward from the hook-plate and hooks. (See again Fig. 6.) By the means described the lip-support can be attached and held in place frictionally, which is an important feature of the invention.

In Fig. 8, I shows a section of rubber tubing, such as may be used to cover the hooks for the purpose of preventing injury to the gums.

The bracket F is connected to the bows through the medium of the braces, and the angular bases of the hook-plates B are pivoted on the ends of the bows, which permits of the latter and their connections being swung entirely out of the way, as I have already explained, and which is so desirable during any operation on the teeth, mouth, or throat.

The collar L is the means by which in connection with the headed end of the expansion-screw D the said screw is made attachable to the bracket F.

I am aware that prior to my invention there has been patented a device known as a "dental jaw-brace," operated by a screw, and also a dental jaw-prop. My invention is not alone a jaw brace or a prop, and it differs from all other contrivances for such purposes, in that it is an expander and dilator, acting upon both the teeth and lips, and so arranged that the instrument may be turned completely out of the way of the operator, leaving the open mouth of the patient clear and unobstructed.

Various changes may be made in the form and arrangement of parts constituting my invention without departing from the nature or spirit thereof.

I claim—

1. The combination with the expansible bow, of the teeth or gums engaging hooks pivoted to the ends of the bows, and rubber tubing covering the hooks.

2. The combination with the expansible bow, of the teeth or gums engaging hooks pivoted on the free ends of the bow and a lip rest and dilator frictionally engaging the base of the hooks.

3. The combination with an expansible bow, of hooks pivoted on the free ends of the bows and consisting of an angular base-plate having two upturned ends, the horizontal part of the base-plate being pivoted to the ends of the bows.

4. A lip dilator and support consisting of a cross-bar spoon-like lip-support extending from each side thereof, and legs and a plate depending from said cross-bar.

5. The combination with the expansible and contractible bows and screw for controlling the same, of teeth-hooks pivoted on the ends of the bows, said hooks consisting of an angular plate with two upturned ends, the horizontal part of the angular hook-plate being pivoted on the ends of the bows.

In testimony whereof I have signed my name to this specification in the presence of two subscribing witnesses.

CLEVELAND G. DAVIS.

Witnesses:
  LILLIAN F. WHITE,
  J. ROCH MAGNAN.